June 19, 1962  H. J. TYLER  3,040,155
CONTROL APPARATUS
Filed May 31, 1960  2 Sheets-Sheet 1
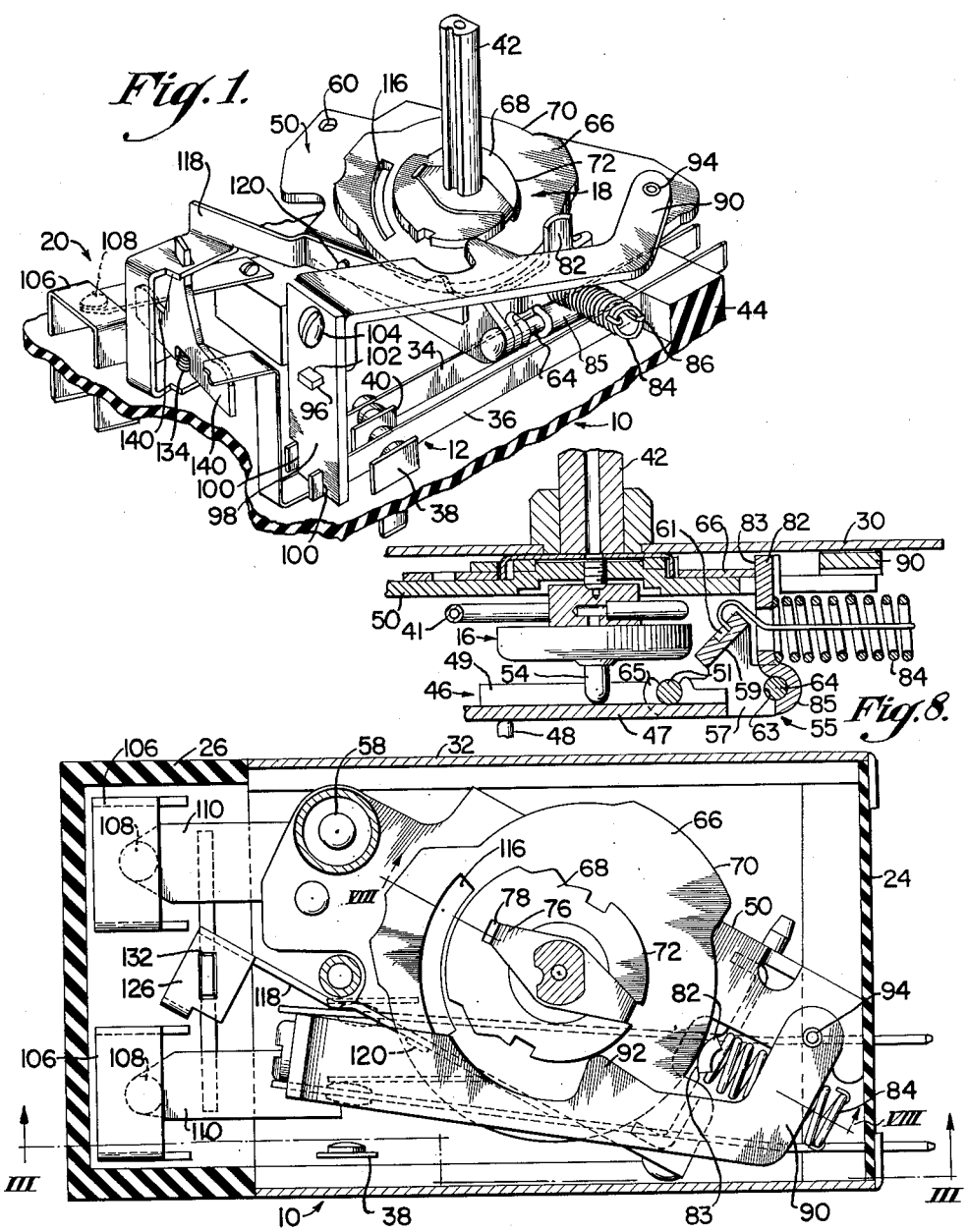

June 19, 1962 H. J. TYLER 3,040,155
CONTROL APPARATUS
Filed May 31, 1960 2 Sheets-Sheet 2
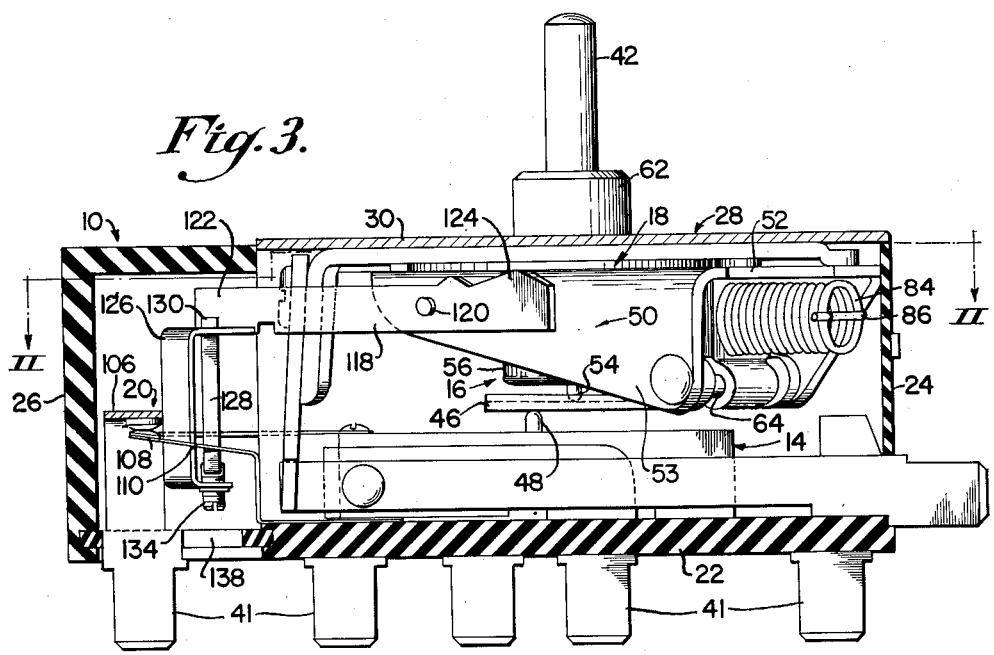
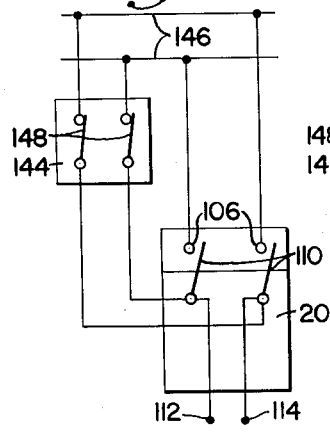
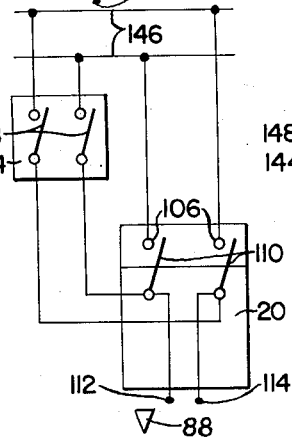
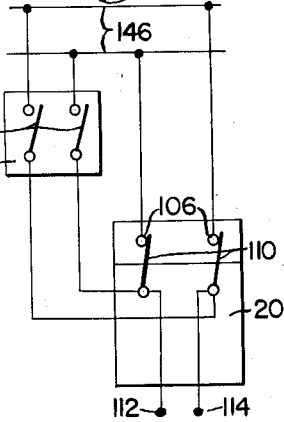
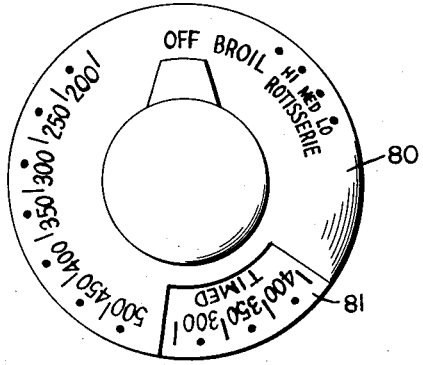

United States Patent Office 3,040,155
Patented June 19, 1962

3,040,155
CONTROL APPARATUS
Hugh J. Tyler, Jeannette, Pa., assignor to Robertshaw-Fulton Controls Company, Richmond, Va., a corporation of Delaware
Filed May 31, 1960, Ser. No. 33,041
5 Claims. (Cl. 219—20)

This invention relates to control apparatus and more particularly to an improved time and temperature control apparatus controlling an energy source for heated ovens.

At the present time, heated ovens for domestic ranges generally utilize a clock controlled switch with an integral three-position manual control to control the heat energy supply. The three-position manual control has a "set" position, an "off" or "tripped" positions, and a "manual" position. In order to use the clock control, the operator sets the starting time and the stopping time on the clock by means of indicators on the face of the clock, after which the three-position manual control is placed in the "set" position.

With an elapse of time to the indicated starting time, the oven is energized. After an elapse of a predetermined time, as determined by the difference between the starting time and the stopping time, the oven is deenergized and the three-position control switch moves automatically to the "tripped" or "off" position, thereby deenergizing the supply of heat energy. Later, when it is desired to use the oven without the clock control, it becomes necessary for the operator to manually move the three-position control switch from the "off" or "tripped" position to the "manual" position in order for the operator to manually control the energy supply to the oven.

In many instances, such as the ordinary domestic oven range after the timed cycle, the operator forgets to set the control switch to "manual" in the mistaken belief that the manual oven controls are operative, thereby causing many unnecessary service trips, financial loss, and great irritation to the customers, service personnel, and oven manufacturers. The added complication of the "manual" switch position has fostered a distrust of the clock control switch, which has led to the clock control switch being viewed with great skepticism and as a necessary chore rather than as an everyday convenience. In addition, through distrust of the clock controlled switch, the operator does not fully utilize the timed features so that the complete oven heating operation can be accomplished without the operator's presence.

Furthermore, it has been the practice in thermostatically controlled switches incorporating a clock control system to provide a plurality of separate electrical circuits which necessitate complicated wiring, additional switches, contacts, and ductwork, thereby greatly increasing manufacturing and maintenance expense and inconvenience of servicing.

It is an object of this invention to incorporate two control conditions on a single control dial for an oven wherein one control condition is for normal use, which is not affected or controlled in any way by a timed condition, and a second temperature control range, which can be used for a timed condition.

Another object of this invention is to simplify the control of the heated oven in both the manual control position and the clock controlled position.

Still another object of this invention is to incorporate in one housing a timed and thermostatic switch control whereby after a timed operation, the switch control is automatically set for manual control and disengages the timed control.

Other objects and advantages of this invention will be apparent from the following description taken in connection with the accompanying drawings wherein:

FIG. 1 is a partial perspective view of the control device;

FIG. 2 is a partial sectional view of control device of this invention taken on the line II—II of FIG. 3;

FIG. 3 is a partial sectional view of FIG. 2 taken on the line III—III of FIG. 2;

FIG. 4 is a schematic view of the electrical circuit of the control device with the clock switch in the "set" position and the manual thermostat switch in the "off" position;

FIG. 5 is a schematic view of the electrical circuit of the control device with the clock switch in the "tripped" position and the manual thermostat switch in the "off" position;

FIG. 6 is a schematic view of the electrical circuit of the control device with the clock switch in the "tripped" position and the manual thermostat switch in the manual position;

FIG. 7 is a plan view of a temperature setting dial which can be used with the control device of this invention; and FIG. 8 is a partial sectional view of the control device of this invention taken along the line VIII—VIII of FIG. 2.

Referring to FIGS. 1, 2, and 3, the control device of the present invention is shown comprising a casing structure, indicated generally at 10, which contains switch means, indicated generally at 12, energizing means, indicated generally at 14, condition responsive means, indicated generally at 16, control means, indicated generally at 18, and a parallel switch assembly, indicated generally at 20.

The construction of the control device, which has been adapted for use in the present combination, is similar to that shown in U.S. patent application No. 754,208 filed August 11, 1959, to Hugh J. Tyler. The casing structure 10, which can be molded from any suitable insulating material, is shown as being comprised of a base portion 22, an upstanding end portion 24, and an oppositely disposed enclosed end portion 26, which accommodates the parallel switch assembly 20. The enclosed integrally molded housing portion 26 of casing 10 forms a boxlike enclosure having sidewalls, an end wall, and a top wall. A snap-on U-shaped metallic cover member 28, having a top portion 30 and downwardly extending side portions 32, cooperates with the structural elements of casing 10 to form a substantially rectangular member having a hollow interior. Top portion 30 of cover member 28 is provided with a centrally disposed aperture (not shown) which accommodates upwardly extending control shaft 42.

Switch means 12 comprises a plurality of resilient switch arms 34, 36 which are shown in FIG. 1 as being pivotally anchored in the base 44 of end portion 24 of casing 10. Switch arms 34 and 36 carry suitable electrical contacts near their free ends which are cooperable with a plurality of stationary contacts 38, 40 secured to the base portion 22 so that a portion of each stationary contact extends both inwardly and outwardly of the casing 10 on base portion 22. Switch arms 34 and 36 are operable in a manner to be described hereinafter about their pivoted anchored ends in a plane substantially parallel to and spaced from the plane of base portion 22. Switch arms 34 and 36 are movable through a plurality of positions relative to contacts 38 and 40 to selectively connect a plurality of terminals 41. In this manner, various oven heating sources are energized by the engagement of switch arms 34 and 36 with stationary contacts 38 and 40.

Energizing means 14 is operative to control the energization of the various heating circuits determined by the positions of switch arms 34 and 36 in engagement with stationary contacts 38 and 40. Energizing means 14 is rigidly secured to the base portion 22 of casing 10 by any suitable means, such as screws. Generally, energizing means 14 can take the form of a suitable electric switch operable between one or more electrical circuit controlling positions by a switch operator lever arm 46. Switch operator lever arm 46 engages switch button operator 48 which, for the purposes of this description, will be considered normally biased upwardly to a switch "closed" position and movable downwardly to a switch "open" position.

A U-shaped mounting plate 50 provides a rigid means for mounting condition responsive means 16 to its bight portion 52 so as to be positioned between the downwardly depending legs 53. A downwardly depending projection 54, located on the expansible and contractible diaphragm 56 of the condition responsive means 16, is positioned to engage the upper surface of switch operator lever arm 46.

Control means 18 is mounted to the upper surface of the bight portion 52 of U-shaped mounting plate 50 in such a manner as to be substantially in axial alignment with the downwardly depending projection 54 on the condition responsive means 16.

As best indicated in FIGS. 1 and 2, mounting plate 50 is secured to the top portion 30 of metallic cover member 28 by any suitable means, such as a rivet 58 passing through aperture 60 of the mounting plate 50. A mounting means 62 rotatably accepts and supports control shaft 42. Step rivet 94 provides a second support for U-shaped mounting plate 50.

Condition responsive means 16 can take the form of a thermostat so that the diaphragm 56 is in communication with a capillary tube 41, as shown in FIG. 8, which extends exterior of casing 10 for communication with the usual tubular element (not shown) located in the heated chamber. As is well known in the art, condition responsive means 16 and capillary tube 41 contain a liquid or other material which expands upon the application of heat and serves to actuate the diaphragm 56 sufficiently to move projection 54 in an upward or downward direction.

As previously recited, condition responsive means 16 has an operative connection to energizing means 14 which takes the form of a switch operated lever arm 46. As indicated in FIG. 8, actuating lever 46 comprises a web portion 47, plural upstanding side portions 49, and a pin 51 integrated with side portions 49 at one end thereof with its axis disposed at substantially right angles to the plane of side portions 49. Actuating lever 46 is adapted to be pivoted about pin 51 by condition responsive means 16 and is shown disposed in a substantially horizontal plane with the top surface of web portion 47, intermediate its ends, abutted by projection 54 and with the bottom surface of web portion 47 at the free end thereof abutting operator 48.

Pin 51 is movable vertically by an overshoot lever, indicated generally at 55, to vary the temperature to which condition responsive means 16 will be responsive. Overshoot lever 55 is shown generally in the form of a channel having plural parallel spaced leg portions 57 and a medial portion 59 disposed upwardly at an acute angle to the plane of the bottom surface of leg portions 57. One end of each of the leg portions 57 is suitably apertured and adapted to receive a pin 64, the ends of which pass through apertures 63 of the leg portions 57. As shown in FIGS. 1 and 8, pin 64 cooperates with apertures in downwardly depending legs 53 of U-shaped mounting plate 50. An arcuately formed cam follower 82, having an elongated recessed portion 85 adapted to cooperate with pin 64, is mounted by means of spring 84 to overshoot lever 55. One end of spring 84 engages recess 61 in the medial portion 59 so as to bias cam surface 83 into engagement with cam 66 and position recess portion 85 in engagement with pin 64. In this manner, overshoot lever 55 is adapted to move with a rocking motion about pin 64 so that the free end thereof is caused to move in a substantially vertical plane with an oscillatory movement. The free end of overshoot lever 55 is formed with suitable detents 65 in the top edge of leg portions 57, which detents are adapted to receive pin 51 of actuating lever 46 for pivotal movement therein. The bottom surface of the free end of lever arm 46 engages and abuts upon switch button operator 48 of energizing means 14. By this construction, excessive temperatures recorded by the condition responsive means 16 pivots lever 46 about operator 48 in a clockwise direction as viewed in FIG. 8. The motion of lever 46 is transmitted to overshoot lever 55 by pin 51 and detent 65 so that overshoot lever 55 is rotated in a counterclockwise direction about pin 64. Spring 84 allows lever 55 to pivot about pin 64 while retaining cam follower 82 in operative position. Thus, it will readily be seen that overshoot lever 55 permits lever 46 and pin 51 to move in response to overtemperatures after operator 48 has been fully actuated which actuation prevents further movement of lever 46.

Control means 18 takes the form of a plurality of more or less centrally apertured cam members 66 and 68 which have peripheral cam surfaces 70 and 72, respectively. Cam members 66 and 68 are disposed one on top of the other intermediate the top surface of mounting plate 50 and the bottom surface of cover member 28 with the central apertures thereof disposed about the base of control shaft 42 of control means 18.

A lock member 76 cooperates with radially disposed grouping slots 78, which are located for alignment in both cam member 66 and cam member 68, to securely position both cam members in engagement with control shaft 42 of control means 18. Cam members 66 and 68 and lock member 76 are rotatable in either the clockwise or counterclockwise direction as a unit to an infinite number of positions by rotation of control shaft 42 of control means 18. One end of control shaft 42 is rotatably mounted in the bight portion 52 of the U-shaped mounting plate 50, whereas, the other end of control shaft 42 is adapted to receive a manually rotatable dial 80, shown in FIG. 7.

As shown in FIG. 7, dial 80 has a plurality of control indicia marked thereon which correspond to an "off" position, a "broil" position, a plurality of "baking" positions, and a plurality of "rotisserie" positions. In addition, a special portion 81 of the dial 80 has indicia marked thereon which corresponds to a "timed" position.

Cam member 66, which is shown in FIGS. 1 through 3 as the lower cam member, has an operative connection to condition responsive means 16 which takes the form of a cam follower 82 disposed for rocking movement about pin 64. Cam follower 82 is formed generally with a recessed portion 85 and an upstanding cam surface portion 83, which is adapted to slide on cam surface 70. A pair of integrally formed leg members, located at each lateral end of the recessed portion 85, extend substantially at right angles to the length of the recessed portion 85 and are suitably apertured to receive pin 64. An aperture in cam follower 82 is centrally located intermediate the leg members thereof.

A compression spring 84, acting upon the outwardly projecting portions of arcuately bent pin 86 which extends through the aperture of the base portion of cam follower 82, biases overshoot lever 55 into operative engagement with cam follower 82. Pin 86 is operatively connected to overshoot lever 55 which translates the rocking motion of cam follower 82 to switch operator lever arm 46 so as to vary the distance of movement required of projection 54 to actuate switch button 48 of energizing means 14. As shown in FIG. 8, clockwise rotation of switch operator lever arm 46 about pin 51 engages projection 54 of condition responsive means 16 so that the switch button operator 48 will be released upwardly and the energization means 14 will therefore be moved to the switch "closed" position.

It will be apparent, therefore, that rotation of control means 18 by means of dial 80 and control shaft 42 positions switch operator lever arm 46 relative to projection 54 of condition responsive means 16. Switch button operator 48 will be moved upwardly or downwardly to energize or deenergize energizing means 14 upon movement of projection 54 in response to temperature changes in condition responsive means 16. If, for example, dial 80 is moved to a position of 350° relative to the indicia 88, as shown in FIG. 5, the rocking motion of cam follower 82 will be translated to switch operator lever arm 46 so that the energizing means 14 will energize a heating source until the condition responsive means 16 moves in response to a temperature of approximately 350° to depress switch button operator 48 on energizing means 14 and thereby deenergize the heating source.

Cam member 68, which is the uppermost cam in FIGS. 1 and 2, is operatively connected to switch means 12 by an elongated arcuately-shaped cam follower 90. Cam follower 90 is disposed in substantially the same plane as cam member 68 intermediate the upper surface of mounting plate 50 and cover member 28. An extension 92, located intermediate the ends of cam follower 90, is adapted to slide on cam surface 72 of cam member 68. One end of cam follower 90 is operatively connected to mounting plate 50 by a pivot pin 94. The other end of cam follower 90 extends downwardly at substantially right angles to the normal plane of cam follower 90 and has a tongue member 96 formed thereon. Switch means 12 are operatively connected to cam follower 90 by an elongated insulating board 98, shown formed with a plurality of grooves 100 at one end thereof. A recess 102, located substantially intermediate the longitudinal ends thereof, is adapted to receive the tongue 96 of cam follower 90. Insulating board 98 is disposed substantially parallel to the downwardly extending portion of cam follower 90 with one end secured thereto by a suitable means, such as a machine screw 104. Grooves 100 receive the free end portions of switch arms 34 and 36. The resilient characteristics of switch arms 34 and 36 are such as to cause pivotable movement of cam follower 90 about pin 94 in a clockwise direction, as viewed in FIG. 2, thereby biasing the extension 92 into engagement with the cam surface 72.

In the operation of the control device so far described, switch means 12 and energizing means 14 will be operatively connected intermediate the source of electrical energy and the heating elements for the heated space. Dial 80 can be rotated in either the clockwise or the counterclockwise directions through an infinite number of degrees and, when thus rotated, cam members 66 and 68 will be simultaneously rotated therewith through a corresponding angular movement. Cam follower 82, as described above, controls the thermostatic or temperature responsive device of the control device. Cam follower 90 is biased into engagement with cam surface 72 of cam member 68 by the bias of switch arms 34 and 36 and will accordingly pivot about pin 94 in a manner which will be determined by the general configuration of cam surface 72. Pivotal movement of cam follower 90 causes insulating board 98 to move in an arc substantially transverse to the longitudinal length of switch arms 34 and 36, thereby causing simultaneous movement of switch arms 34 and 36 about their individual pivot points relative to stationary contacts 38 and 40. The configuration of cam surface 72 is subject to an infinite variety of variations and it should be evident that for every angular position of cam member 68, any desirable position of switch arms 34 and 36 relative to stationary contacts 38 and 40 is obtainable. It should be further evident that additional switch arms and stationary contacts can be operated by a cam follower 90 to control additional heat sources.

It will thus be seen that the control device, by rotation of a control means 18, will selectively energize one or more separate heat sources while retaining thermostatic control over the heated space. In a practical application, referring to FIG. 7, the switch arms 34 and 36 will energize separate heat sources, such as a "baking" heat source denoted by the range of temperatures indicated on dial 80 as being from 200° to 500°, or actuation of the dial 80 will energize heat sources for "rotisserie" operation or "broil" operation.

It is, however, highly desirable to have controlled timed delay heating operations also contained on the dial 80 so that, for example, in the ordinary domestic oven, a baking operation can take place by setting dial 80 at 350° in the "timed" portion of dial 81 and setting a cooperating clock mechanism. In this manner, the oven will be energized at a particular time and will be operatively energized to maintain a constant temperature, such as 350°, for a predetermined time as controlled by the clock mechanism.

The parallel switch assembly 20 comprises two contacts 106 which cooperate with two movable contacts 108 positioned on elongated arcuately bent resilient contact arms 110. As shown in FIGS. 4 through 6, parallel switch assembly 20 controls the energization of the mechanisms for actuating the heat source (not shown).

As shown in FIGS. 1 and 2, cam member 66 has a slot 116 formed therein, which slot describes an arc relative to the center of cam member 66. Cam member 66 is operatively connected to switch arms 110 by a cam follower 118 which is pivotally mounted to one leg of the U-shaped mounting plate 50 by pivot pin 120. Cam follower 118 has an elongated arm 122 which has cam surface 124 located on one end and an integrally formed arcuately bent C-shaped member 126 formed at the opposite end.

Integrally formed C-shaped member 126 of cam follower 118 forms a caged retaining structure which retains a substantially T-shaped operator 128 therebetween. The shank portion 130 of operator 128 is disposed in a suitable aperture 132 on the upper arm of C-shaped member 126. An adjusting screw 134, threadedly engaged in an aperture in the bottom leg of the C-shaped member 126, cooperates with slot 136 centrally disposed in the bottom portion of the T-shaped operator 128. T-shaped operator 128 can thus be vertically positioned a slight distance between the upper and lower legs of the C-shaped member 126 by adjustment of adjusting screw 134.

As shown in FIG. 3, the base portion 22 of casing 10 has an opening 138, thereby providing ready access to adjustment screw 134. The arm portions 140 of operator 128 engage the undersurface of resilient contact arms 110, which contact arms are normally biased downwardly to engage T-shaped operator 128. Cam follower 118 vertically positions operator 128 to control the opening or the closing of parallel switch assembly 20.

Biased switch contact arms 110 normally bias cam follower 118 in a counterclockwise direction about pin 120 so as to continually engage cam surface 124 of cam follower 118 with the lower surface of cam member 66. Although contacts 106 and movable contacts 108 are biased normally to separate, the T-shaped operator 128, which is operatively controlled by cam follower 118, will bias the resilient contact arms 110 upwardly to close the contacts. When control means 18 is rotated to the timed condition, as indicated by dial 80, cam 66 is also rotated so that cam surface 124 engages slot 116. Contact arms 110, being adapted to be biased downward, exert a force on arms 140 of T-shaped operator 128, thereby opening parallel switch assembly 20.

When the dial is in the "timed" position, the movable contacts 108 on contact arms 110 disengage the stationary contacts 106 and the heating operation is controlled entirely by the clock mechanism in conjunction with thermally cycling energizing means 14 and condition responsive means 16.

As shown in FIG. 4, clock switch 144 controls a parallel circuit from supply circuit 146 to supply energy to load circuit contacts 112 and 114. At a particular time, the clock switch contacts 148 of clock switch 144 are closed. The heating oven is energized for a predetermined time, as determined by the clock mechanism controlling the position of clock switch contacts 148.

When the timed heating operation is concluded, the clock contacts 148, shown in FIG. 5, are actuated to an open position by the clock mechanism. The heat source controlling mechanism, connected to the load circuit contacts 112 and 114, is deenergized by both the clock switch 144 and the parallel switch assembly 20. Subsequent rotation of control means 18 will actuate cam follower 118 to reengage movable contacts 108 on contact arms 110 with the stationary contacts 106. Accordingly, a subsequent manual heating operation can be performed by adjusting the dial 80 to the desired temperature.

When the dial is disposed at a position other than within the "timed" range, movable contacts 110 are engaged with the corresponding fixed contacts 106 to provide a continuous connection between supply circuit 146 and load contacts 112 and 114. The closing of contacts 110—106 effectively shorts out clock switch 144 so that contacts 112 and 114 are energized regardless of whether clock switch contacts 148 are open or closed. Thus, when contacts 110—106 are mechanically held open by the positioning of the dial within the "timed" range, the supply of power to load contacts 112—114 is solely through clock switch 144, to provide a timed operation. When contacts 110—106 are closed, they provide a bypass around clock switch 144 between the supply and load.

It is to be understood that load circuit contacts 112 and 114 can be connected to an electrical system (not shown) which can control either an electrical heating source or a fluid gas source.

From the foregoing description and the accompanying drawings, it will readily be understood that control apparatus has been devised which combines thermostatic control and timed control on one dial control which operates in conjunction with a timing mechanism. While the invention has been described and illustrated in detail as pertaining to the control of an oven, it will be understood, of course, that the invention is not to be correspondingly limited but it is to include all changes and modifications coming within the scope of the appended claims.

I claim:
1. In a control apparatus for a heating system having a heating unit and a source of operating energy for said heating unit; the combination comprising electrically operable control means for controlling the flow of energy from said source of operating energy to said heating unit, energizing means operable between controlling positions for electrically connecting control means to a source of electrical power, temperature responsive means operatively connected to said energizing means and being movable in response to variations in a range of predetermined temperatures to be controlled, adjustable means operatively connected to said temperature responsive means, a plurality of cam members being adapted for movement with said adjustable means, a first switch means operatively connected to one of said cam members for movement to a plurality of positions to selectively energize one of a plurality of electrical circuits between said control means and said source of electrical power, a second cam member being formed with a slot therein, a pivotally mounted cam follower being adapted for cooperation with said slot, a second switch means being adapted for pivoting said cam follower into engagement with said second cam member, timer means, a parallel circuit connecting said control means to said electrical power source and including said timer means, rotation of said adjustment means energizing said parallel circuit, and said second switch means deenergizing said first electrical circuit whereby said control means has time and thermostatic controlled energization.

2. In a control apparatus for a heating system having a heating unit and a source of operating energy for said heating unit; the combination comprising electrically operable control means for controlling the flow of energy from said source of operating energy to said heating unit, adjustable means being selectively movable to a plurality of positions, temperature responsive means being adapted for adjustment through a range of predetermined conditions by the movement of said adjustable means, a first electrical circuit and a second electrical circuit each being adapted to be connected to a source of electrical energy, a timer means operatively controlling said second electrical circuit, a third electrical circuit adapted to energize said control means and being operatively associated with said first electrical circuit and said second electrical circuit, a plurality of cam members being adapted for movement with said adjustable means, one of said cam members selectively energizing said first and said second electrical circuits, a second cam member adjusting said temperature responsive means, a pivoted cam follower having one end adapted to operatively engage said second cam member, a T-shaped member being operatively connected to the opposite end of said cam follower, switch means operatively associated with said first electrical circuit by a plurality of switch arms engaging said T-shaped member, said switch arm biasing said cam follower into engagement with said cam member, and a slot formed in said second cam member to cooperate with said cam follower whereby said switch arms deenergize said first electrical circuit when said cam follower engages said slot upon rotation of said adjustable means.

3. The combination recited in claim 2 wherein said switch arms engage U-shaped contacts and said T-shaped member varies the contact pressure between said switch arms and said U-shaped contacts.

4. The combination recited in claim 3 wherein said T-shaped member of said cam follower has an adjustment means for positioning said switch arms relative to said cam follower to vary the bias of said switch arms.

5. The combination recited in claim 4 wherein said cam follower has an elongated length and the base leg of said T-shaped member is disposed substantially normal to said elongated cam follower whereby said cam follower exerts the maximum force on said switch arms to overcome the bias thereof.

References Cited in the file of this patent
UNITED STATES PATENTS

| | | |
|---|---|---|
| 2,207,870 | Myers | July 16, 1940 |
| 2,410,014 | Clark | Oct. 29, 1946 |
| 2,798,929 | Wojcik | July 9, 1957 |
| 2,811,626 | Tuttle | Oct. 29, 1957 |